United States Patent [19]

Hatley

[11] 3,803,592

[45] Apr. 9, 1974

[54] KEYBOARD AND DIGITAL CIRCUIT THEREFOR

[75] Inventor: Derek J. Hatley, Wyoming, Mich.

[73] Assignee: Donnelly Mirrors, Inc., Holland, Mich.

[22] Filed: Sept. 11, 1972

[21] Appl. No.: 287,997

[52] U.S. Cl. ........................ 340/365 B, 340/347 DD
[51] Int. Cl. ............................................ H04l 15/06
[58] Field of Search ....................... 340/365 S, 365 E

[56] References Cited

UNITED STATES PATENTS

| | | | |
|---|---|---|---|
| 3,676,615 | 7/1972 | Wiedmer | 340/365 E |
| 3,720,938 | 3/1973 | Leposavic | 340/365 E |

*Primary Examiner*—Thomas B. Habecker
*Attorney, Agent, or Firm*—Price, Heneveld, Huizenga & Cooper

[57] ABSTRACT

In a mechanically operated keyboard employing keys having a multiplicity of electrical switch contacts for providing an encoded electrical output signal corresponding to and uniquely identifying individual key stations; a digital circuit provides a strobe output signal only when all of the electrical switch contacts associated with a given key station have been actuated. In one digital circuit for providing a strobe output signal, each switch contact is assigned a digital weight, and a strobe output is generated only when a predetermined digital count indicative of complete switch closures has occurred. In another digital circuit, the number of closures of switch contacts of a key station are compared in a digital comparator with stored closure signals from a preceding key station actuation to develop a strobe output signal only when the signals are different thereby indicating that a different key station has been actuated or the same key station re-actuated. In still another embodiment of the digital circuit employed with the keyboard, a read-only-memory is employed to detect the number of closures and provides an encoded output for each key station which uniquely identifies the key station and simultaneously produces an enable signal for the generation of a strobe pulse, only when complete contact closures have been effected.

29 Claims, 11 Drawing Figures

KEYBOARD AND DIGITAL CIRCUIT THEREFOR

BACKGROUND OF THE INVENTION

The present invention relates to a mechanical keyboard for producing data output signals, and particularly to digital circuits employed to provide data output and strobe signals when all of the contacts of an individual key station are closed.

Conventional keyboards are either mechanical or electrical in design. With the advent of computer applications whereby the output signals from a keyboard are coupled directly to various computer terminal equipment, it has become necessary to encode the output signals from the keyboards used in conjunction with the computer equipment. Conventional mechanical keyboards are relatively unsuccessful in such applications because of contact bounce of the electrical switches employed. Also, errors in the data output signals are caused by timing differences between the closing of individual switches associated with each key station. Thus, computer inputs to which conventional keyboards are coupled, and which are then relatively fast reading, interpret contact bounce and timing lags as an erroneous code or data signal. The keyboard of the present invention, however, employs a unique switch design which has a single movable electrical contact with a plurality of contact fingers which, together with a multiplicity of fixed contacts, form electrical switches. A digital control circuit is coupled to the keyboard and insures that no data output signals are applied to or read by the computer or interface equipment until all of the switch contacts are properly closed. This design overcomes the difficulties faced by conventional mechanical keyboards.

Electrical keyboards employing Hall-effect devices, reed switches, capacitive devices, or magnetic devices are more reliable than some mechanical keyboards but are relatively costly. The keyboard of the present invention, however, provides reliability equivalent to such keyboards but at a much reduced cost.

An electrical keyboard using a single movable contact with a plurality of contact fingers has employed an analog voltage comparator which senses the voltage across a common terminal coupled to the switch contacts and compares the voltage so detected with a fixed reference voltage to determine whether or not all of the switch contacts have been made. A strobe output pulse is generated by this system when all of the switch contacts are closed as indicated by the comparator. This system requires a well regulated voltage supply and relatively complex and expensive circuitry as compared with digital circuitry of the present invention. Also such system lacks many of the features provided by the system of the present invention.

SUMMARY OF THE INVENTION

A mechanically operated keyboard embodying the present invention comprises a plurality of individual key stations each having an electrical switch formed from a movable switch contact with a plurality of fingers that contact an array of corresponding fixed contacts when a key is actuated. Each of the fixed contacts is coupled to a source of operating power and to a keyboard output terminal. Each contact is assigned a digital weight and is coupled to a digital circuit which detects the sum of the digital weights of actuated keyboard output terminals and develops a strobe output signal only when a predetermined total digital count is detected thereby indicating that all of the movable contact fingers have electrically contacted their associated fixed contacts and an accurate data output signal corresponding to the individual key station is developed. The circuit of the present invention includes means which prevents a spurious data signal output by preventing the generation of a strobe signal until the key of a previously actuated key station is released. Additionally, the circuit of the present invention provides a key roll-over feature to produce sequential data and strobe output signals when two keys are sequentially actuated but simultaneously held down by the operator.

In one embodiment of the present invention, a read only memory is employed to generate both the data output signal in response to the closures of the electrical switches associated with each key station and to provide control signals indicative of the proper number of closures used to generate a strobe output signal.

It is an object, therefore, of the present invention to provide a digital circuit for use with a mechanically operated keyboard having a plurality of key stations each with a movable contact having a plurality of contact fingers associated with fixed contacts such that a strobe output signal is generated only when all of the switches of a key station have been closed.

It is another object of the present invention to provide a digital circuit for preventing a spurious output when two or more key stations are simultaneously actuated.

It is still a further object of the present invention to provide a digital circuit providing a two-key roll-over feature for the keyboard.

These and other objects of the present invention will become apparent upon reading the specification together with the accompanying figures.

DETAILED DESCRIPTION OF THE FIGURES

Figure 1:
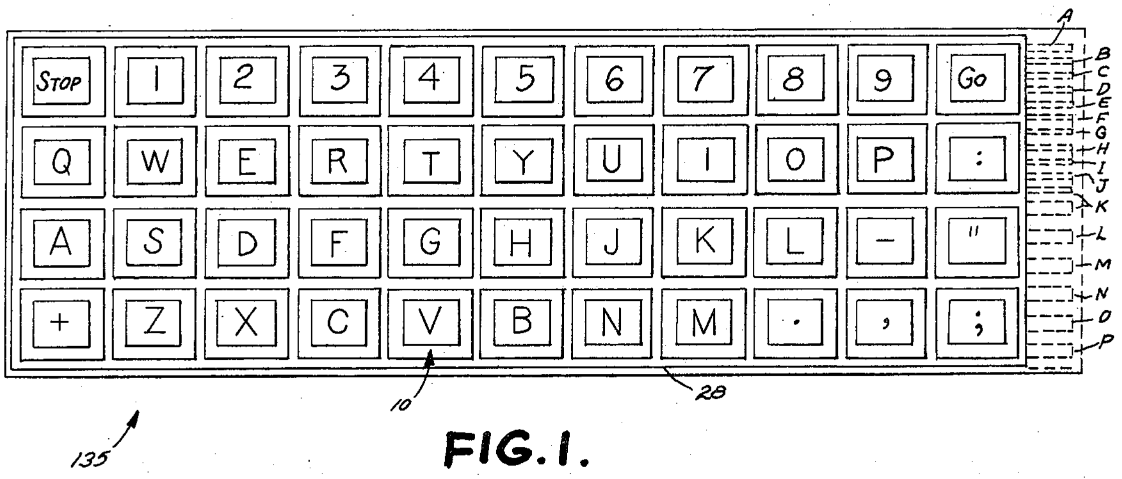
FIG. 1 is a plan view of a keyboard embodying the present invention.
Figure 3:
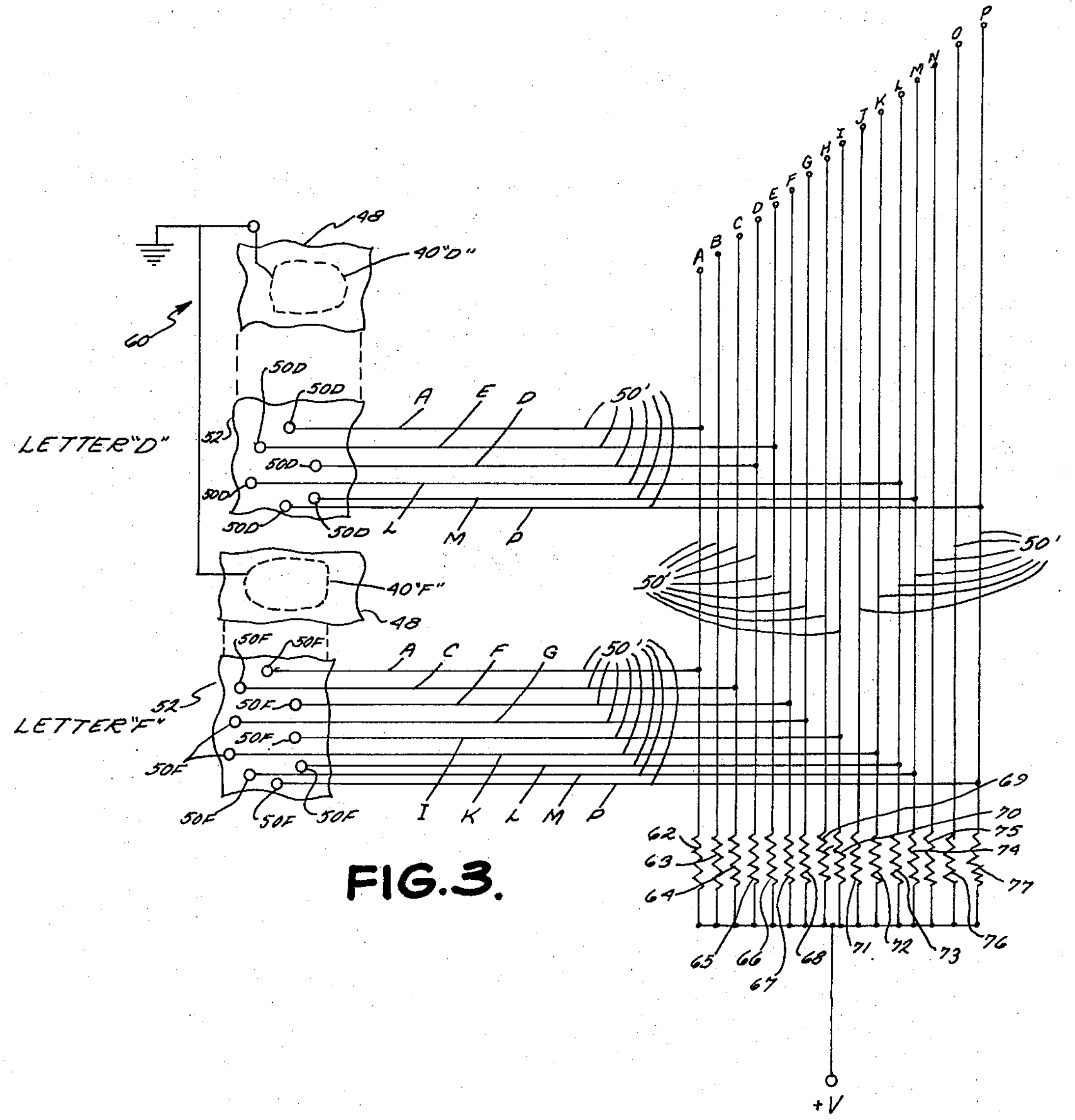
FIG. 3 is a wiring diagram showing the interconnection of the fixed key station contacts to the keyboard output terminals for the letters "D" and "F", and also showing the electrical and mechanical relationship of the movable contacts associated with the fixed contacts shown.
Figures 2, 7:
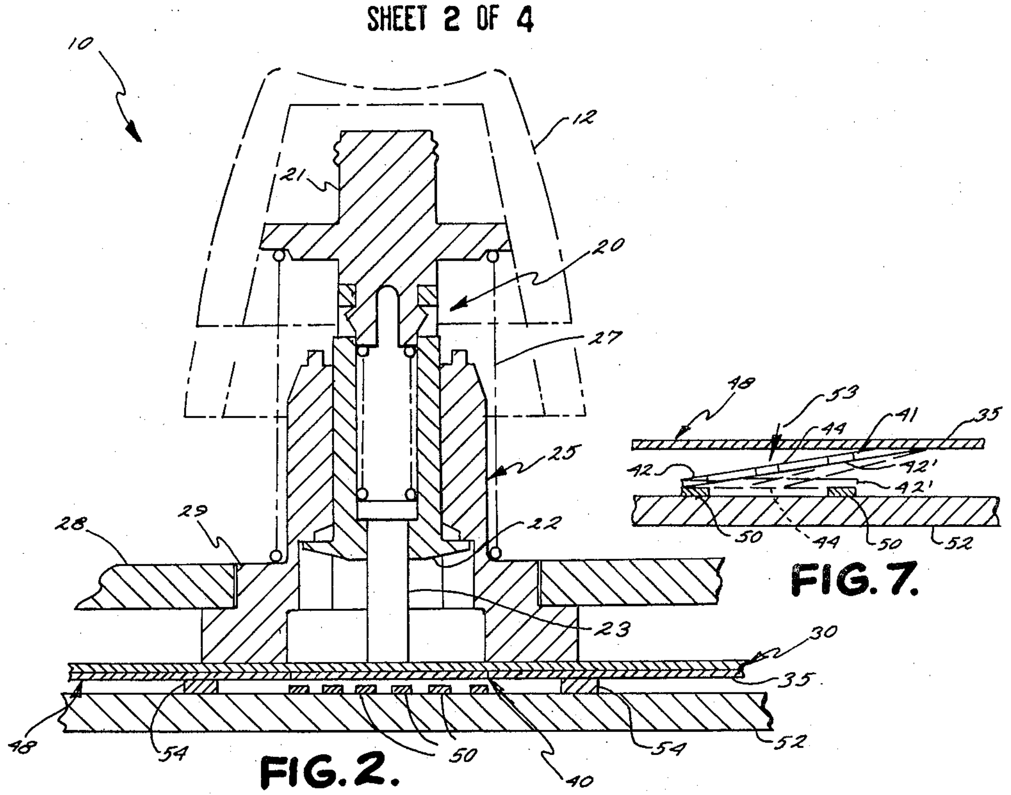
FIG. 2 is a side elevation view in cross section of an individual key station employed in a keyboard embodying the present invention.
FIG. 7 is a section view of the structure shown in FIG. 6 taken along the section lines VII—VII together with the associated fixed contacts.

Referring now in detail to FIGS. 1–3, there is shown a mechanically operated electrical keyboard 135 including a plurality of key stations 10 for each symbol shown in FIG. 1. The keyboard 135 has a plurality of output terminals A–P for coupling electrical output signals from the keyboard to various circuits associated with the keyboard. A typical key station is shown in detail in FIG. 2 where it is seen that the keyboard comprises a face plate 28 with an array of apertures 29 in which the key stations 10 are mounted. Each key station includes a key cap 12 which corresponds to an individual letter, number, or other symbol which is desired to be entered into a computer or other digital interface equipment in the form of an electrical data signal corresponding to an uniquely identifying the symbol. The cap 12 is coupled over a plunger assembly 20 that is moved downwardly when the key station is actuated by the operator. The plunger assembly 20 comprises an end portion 21 over which the cap 12 is mounted, a cylindrical sleeve 22 joined to the member 21; and a plunger 23 slidably mounted within the sleeve 22 which in turn is slidably mounted within a housing 25. A return spring 27 is coupled to the outside periphery of the housing 25 and extends upwardly to contact the end member 21 to return the key to its original position when released by the operator. The housing 25 is fitted within an aperture 29 in face plate 28 of the keyboard to hold the individual key station 10 into position on the keyboard.

Figure 6:
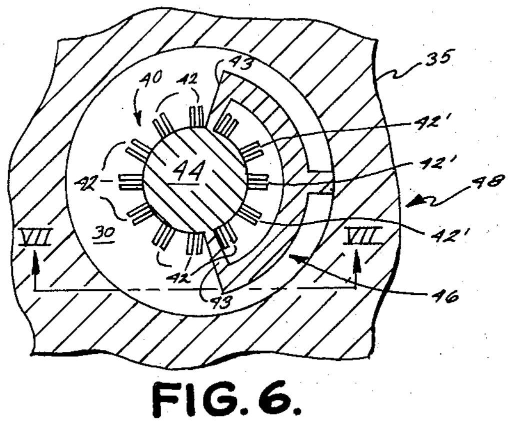
FIG. 6 is an enlarged partial plan view of a movable contact sheet showing the detailed structure of the movable contact of one of the key stations therein.

The plunger 23 contacts a flexible sheet 30 os insulating material which spans the entire array of key stations forming the keyboard and which has on its surface opposite the plunger 23 a sheet 48 of conducting material 35 which is selectively etched away at the area immediately under the plunger 23 to form a movable electrical contact 40. Each key station 10 includes such a movable electrical contact of which FIG. 6 is representative. The movable contact 40 as shown in FIG. 6 comprises a plurality of individual contact fingers 42 formed around the periphery of a central portion 44 of conducting material 35 (shaded in the figure) which is electrically and mechanically coupled to the sheet 48 of conducting material 35 by means of an arm 46 joining the central portion 44 to the sheet 48. The specific movable contact structure of FIGS. 6 through 8 will be discussed below, it being understood that any variety of movable contact designed can be employed with the circuitry of the present invention, it being only necessary that the conducting material 35 be selectively etched away to form a plurality of movable contact fingers which are actuated by the plunger 23 when the key station is actuated by the operator.

Below the movable contact 40 of the key station 10 as shown in FIG. 2 is an array of fixed contacts 50 which are mounted in alignment with some of the contact fingers 42 of the movable contact 40 on an insulated base material 52 which serves to rigidly hold the fixed contacts 50 in place. The flexible insulating material 30 and the conducting layer 35 thereon are supported above the base 52 by means of support members 54 as shown in FIG. 2 which are spaced to allow the plunger 23 to depress the movable contact 40 sufficiently when the key station 10 is actuated so as to cause physical and electrical contact between the movable contact 40 and the array of fixed contacts 50 on the base 52. Each of the individual contacts forming an array of fixed contacts 50 are electrically coupled to output terminals A-P (FIGS. 1 and 3) of the keyboard 135 by means of conductors 50′ (FIG. 3) which, like the fixed contacts 50, can be deposited on the base member 52 as is well known in the art. Conversely, the fixed contacts 50 of each of the key stations 10 forming the keyboard can be formed on a printed circuit board 52 having a layer of conducting material that is selectively etched away to form the individual fixed contacts and their leads to the terminals at the edge of the printed circuit board.

Figure 4:
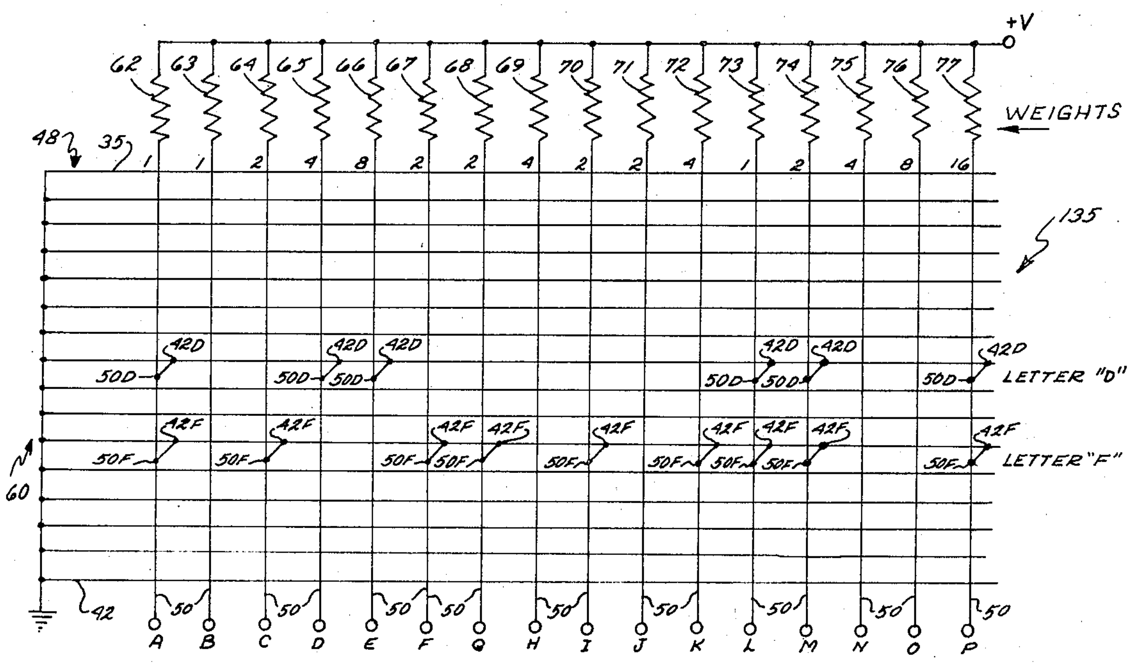
FIG. 4 is an electrical circuit diagram partially in schematic and block diagram form showing one embodiment of a keyboard embodying the present invention.
Figure 4:
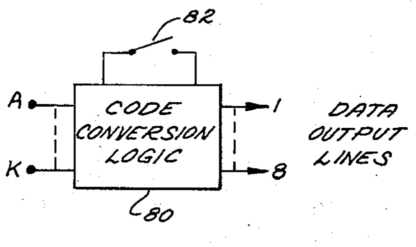
Figure 4:
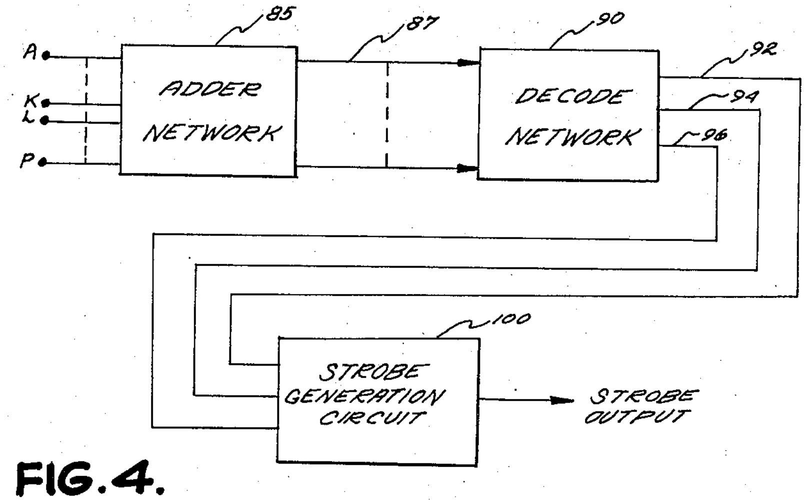

The movable contact fingers 42 of each key station are commonly formed in a sheet 48 of conducting material 35 (FIG. 2) to form a finger sheet 60 which is electrically grounded as shown in FIGS. 3 and 4. It is understood that each key station 10 of the keyboard has in the embodiment shown, 24 movable contact fingers 42 to which a predetermined selected number of fixed contacts are associated to form a unique data signal for each individual key station when the fixed and movable contacts are closed. The fixed contacts 50 for the individual key stations and their leads 50′ coupling the fixed contacts to the keyboard output terminals or code lines are shown in FIGS. 3 and 4.

A voltage source +V is coupled to each fixed contact of every key station through a plurality of voltage dropping resistors 62 through 77 to provide electrical operating power for the keyboard. As an individual key station is actuated, the contact fingers of the movable contact 40 on finger sheet 60 (FIGS. 3 and 4) contact the array of fixed contacts coupled to a predetermined number of resistors 62 through 77 such that a predetermined number of the output terminals A-P are grounded. The voltage at these output terminals thereby drops to zero providing a logic 0 output at the terminals where a movable contact finger has electrically contacted an associated fixed contact. The remaining outputs remain at the voltage of the +V source or a logic 1 level. Each key station will have an array of fixed contacts of a sufficient number to provide a data signal and check line signal to uniquely identify that particular station. The output terminals A–K provide the data signals whereas terminals L–P provide check signals employed to insure proper closure of the contacts of a key station before a strobe pulse is generated.

The key stations for the letters D & F are shown in FIGS. 3 and 4. Letter D has fixed contacts 50D coupled to resistors 62, 65, 66, 73, 74 and 77. Thus, when the key station corresponding to the letter D is actuated, output terminals A, D, E, L, M and P will have a logic 0 output since the fixed contact associated with these output terminals will be grounded on the opposite side of the voltage dropping resistors. The remaining output terminals will remain at the logic 1 state. Similarly, when the letter F key station is actuated by the operator, output terminals A, C, F, G, I, K, L, M, P will have a logic 0 signal due to the closure of movable contact 40F with fixed contacts 50F of the key station.

The output terminals A–K which develop the data output signal uniquely identifying each key station as it is actuated are coupled to corresponding input terminals A–K of a code conversion logic circuit 80. Circuit 80 (FIG. 4) detects the logic 1 and 0 states on lines A–K and converts these signals to standard seven-bit data signals employed with conventional computer equipment and which appear on data output lines 1–8 coupled to circuit 80. Different coding schemes can, of course, be employed. The code conversion logic circuit 80 is of conventional design having a shift key 82 associated with the keyboard and electrically coupled thereto. Key 82 serves to actuate circuit 80 to provide a different data output signal for a key station when the shift key 82 is actuated by the operator.

In addition to coupling the output terminals A–K of the keyboard to the code conversion logic circuit 80, all of the outputs A–P, which include the check lines L–P, are coupled to corresponding terminals A–P of an adder network 85. The output of adder network 85 is coupled to a decoder network 90 by means of conductors 87. The output of circuit 90 is coupled to a strobe generation circuit 100. Circuits 85, 90 and 100 operate to detect a predetermined constant digital count indicative of the condition that all of the switch contacts associated with a key station have been actuated before a strobe output pulse is generated by the circuit 100. This is accomplished by assigning weights to each of the conductors 50′ coupling the fixed contacts of the various key stations to the output terminals A–P. The weights associated with each of the conductors are shown in FIG. 4 below and adjacent the resistors 62–77.

In the preferred embodiment, for example, the total digital count for logic 1 states that occur for each key station that is properly actuated (i.e., all of the switch contacts are electrically made) is a constant k equal to 31. For the letter D, the count 31 is achieved by a logic 1 output state on conductors 50′ coupled to terminals B, C, F, G, H, J, K, N, and O by summing the assigned weights for the conductors which are not grounded by the key station switch closures. The check lines are weighted and the fixed contacts of each key station selected such that the digital sum of weighted counts of logic 1 state data output and check lines, will be 31 when any key station is actuated.

Figure 5:
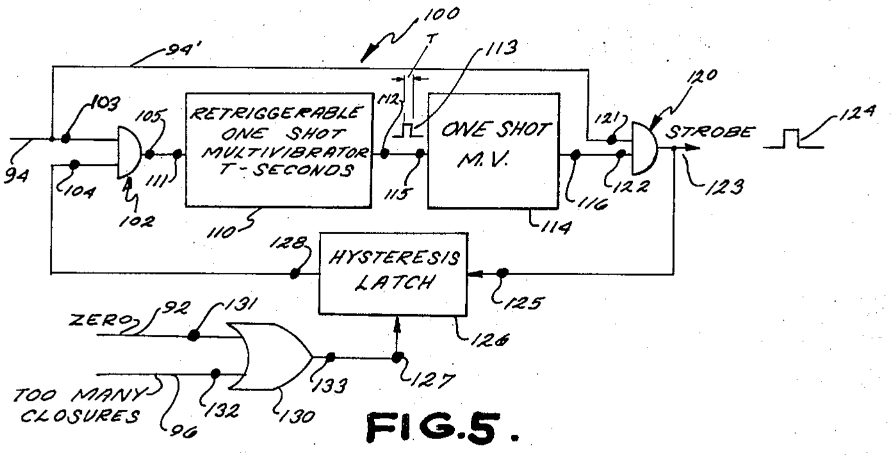
FIG. 5 is a detailed electrical block diagram of the strobe generation circuit shown in FIG. 4.

The adder network 85 in FIG. 4 comprises a plurality of adders with weighted input terminals corresponding to and coupled to correspondingly weighted output terminals A–P of the keyboard. The adder network 85 sums the weighted signals at the keyboard output terminals A–P, and provides at the plurality of output lines 87, digital signals representative of the total detected count. The signals on output lines 87 are applied to the decoder network 90. The decoder network 90 comprises logic circuits which respond to the output from the adder circuit 85 to provide three output signals at lines 92, 94 and 96 corresponding to no switch closures, the proper number of switch closures, and too many switch contact closures, respectively. The strobe generation logic circuit 100 responds to the signals on the three lines (92, 94 and 96) to provide a strobe output signal only when a key station has been properly actuated such that all of the associated switch contacts have been made. Circuit 100 includes circuitry for preventing erroneous data output signals in the event that one or more keys are partially actuated in addition to providing a two-key roll-over feature. The strobe generation logic circuit 100 accomplishes this by means of the circuitry shown in detail in FIG. 5.

The strobe pulse generation circuit 100 includes a first AND gate 102 having two input terminals 103 and 104 and an output terminal 105. The output terminal 105 of the gate 102 is coupled to an input terminal 111 of a retriggerable one-shot multivibrator 110 having an output terminal 112. The output terminal 112 of circuit 110 is coupled to an input terminal 115 of a one-shot multivibrator 114 having output terminal 116. The output terminal 116 of the multivibrator 114 is coupled to an input terminal 122 of a second AND gate 120 which has a second input terminal 121 and an output terminal 123. The output terminal 123 of the second gate 120 provides the strobe output signal which can be coupled to the computer interface equipment to cause it to read the data signal generated by the keyboard. The strobe output signal at terminal 123 is also applied to a hysteresis latch circuit 126 at an input terminal 125 thereof. The hysteresis latch circuit 126 has an output terminal 128 coupled to the input terminal 104 of the first gate 102. Circuit 126 also includes a second input terminal 127 which is coupled to an output terminal 133 of an OR gate 130 having first and second input terminals 131 and 132 coupled to input lines 92 and 96, respectively, as shown in FIG. 2. The input lines 94 from the decoder network 90 (FIG. 1) is coupled to the input terminal 103 of the first AND gate 102 and to the input terminal 121 of the second AND gate 120 by means of the conductor 94′. The strobe circuit operates in the following manner to provide a strobe output signal only when a key station is properly actuated such that the data output signal generated thereby is an accurate representation of the key station actuated.

An electrical signal generated by network 90 (FIG. 4) is applied to conductor 94 as discussed above when all of contacts of the key station are properly closed. The AND gate 102 will trigger the multivibrator 100 only in the concurrent presence of this signal on line 94 and on output signal at terminal 128 of the hysteresis latch circuit 126. The output pulse from the retriggerable monostable multivibrator 110 has a period T chosen to be greater than the contact bounce interval associated with the movable electrical contact of the key station. This assures that multivibrator 110 will be retriggered by pulses due to contact bounce. Only after the T interval (approximately 5 msec) has elapsed with no contact bounce, therefore, will the trailing edge of the output pulse 113 (shown adjacent output terminal 112) occur. The one-shot multivibrator 114 is triggered by the trailing edge of pulse 113 and provides an output signal to the second AND gate 120 which responds thereto to generate a strobe pulse shown by waveform 124 only when the signal on line 94′ is still present. By providing the multivibrators 110 and 114 and gates 102 and 122 therefor, a strobe pulse will be generated only after a key station has been properly actuated and switch contact bounce has settled down.

The circuit inlcudes the hysteresis feature which prevents the generation of more than one strobe pulse and therefore the reading of multiple data output signals, by the single actuation of a key. This feature is provided by the hysteresis latch circuit 126 which, when an output signal occurs at terminal 128 thereof, enables the AND gate 102 to allow the generation of a strobe pulse 124.

The strobe pulse generated at output terminal 123 sets the latch circuit 126 such that there is no output signal at terminal 128 and therefore, a signal on line 94 will not generate a strobe pulse until the hysteresis latch circuit 126 has again been cleared by an output signal from the OR circuit 130 coupled to the input terminal 127 of the latch circuit. The hysteresis latch is cleared by a signal on line 92 which is a "zero" closure signal, or a signal on line 96 which is a "too-many" closures signal. Thus, when a key station is not actuated and all of the contacts are opened prior to the closure of a second key station, the hysteresis latch will be triggered such that a strobe pulse can be generated when the second key station is actuated or the same key station re-actuated.

The second input to the OR circuit 130 from line 96 provides a two-key roll-over feature to the system by triggering the hysteresis latch in the event that too many closures occur such as would happen when two keys are sequentially but nearly simultaneously actuated and are being held down at the same time by the operator.

The first key actuated will generate an enable signal to cause a strobe pulse to be generated and reset the latch circuit 126. Since a second key is actuated shortly thereafter and before the first key raises, no "zero" closure signal will appear on line 92. A "too-many" closures signal will however occur on line 96 and clear the latch circuit 126 such that when the first key is released the enable signal on line 94 generated by the second key will cause a strobe pulse to be generated and appear at output terminal 123. In this manner therefore, the strobe generation circuit 100 provides sequential strobe pulses corresponding to data signals at the output terminals when two keys are sequentially actuated but simultaneously held in the actuated position.

Figure 9:
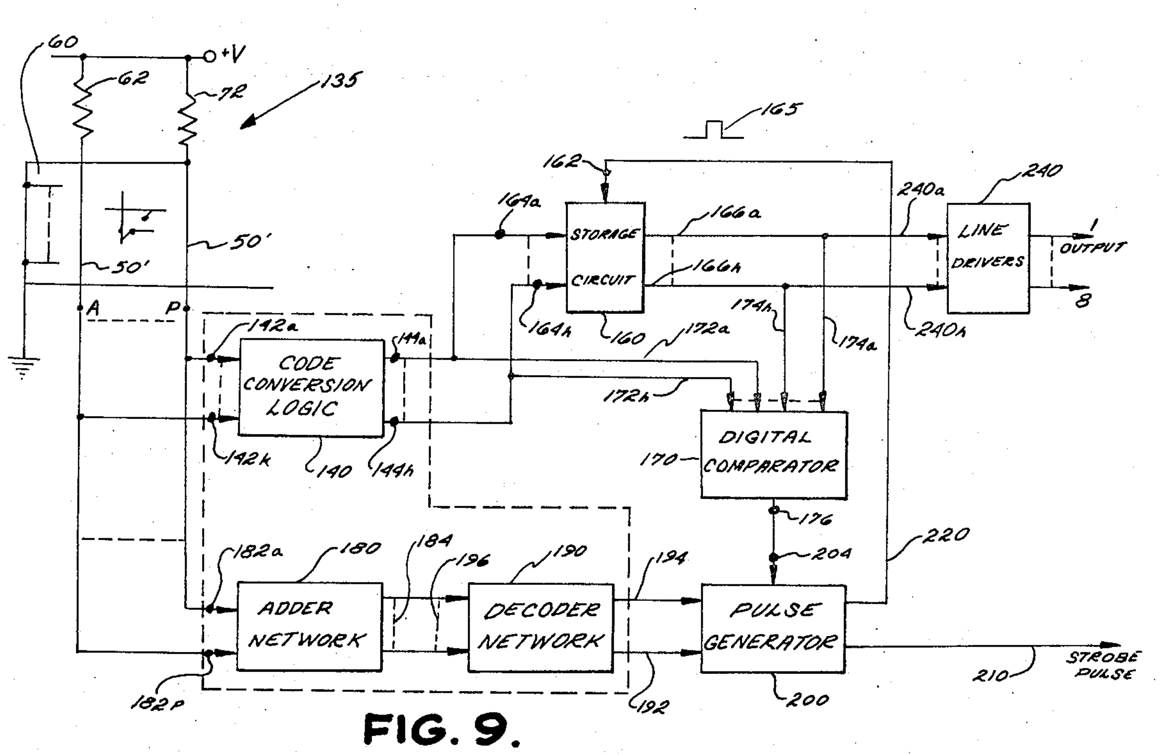
FIG. 9 is an electrical circuit diagram in block form showing an alternative embodiment of the electrical circuit of the present invention.

Another digital circuit which can be employed with the keyboard shown in the upper portion of FIG. 1 is shown in FIG. 9. In the circuitry of FIG. 9, the data output terminals A–K of the keyboard (shown in abbreviated form at 135) are coupled to input terminals 142*a–k* of a code conversion logic circuit 140. The data and check lines A–P are coupled to input terminals 182*a–p* of an adder network 180. Circuit 140 converts the logic 0 and 1 signals from the ouptut terminals A-K of the keyboard into a standard seven-bit data signal appearing at the output terminal 144*a–h* of circuit 140. These terminals are coupled to corresponding input terminals 164*a–h* of a storage circuit 160 which comprises a plurality of latches, and to input terminals 172*a–h* of a digital comparator 170.

The adder network 180 determines the number of contacts closed by summing the weighted counts associated with each conductor 50 and generates signals at output lines 184 which are applied to input lines 196 of a decoder network 190 indicative of the number of contact switch closures.

The decoder network 190 provides a "correct closures" signal on output conductor 194 when a predetermined fixed digital count from adder 180 is received. Network 190 provides a "zero closure" signal on conductor 192 when the adder network detects no contact closures. Conductors 192 and 194 are coupled to input terminals of a pulse generator 200 which develops a strobe output pulse on an output conductor 210 and a clock pulse on an output conductor 220. Conductor 220 is coupled to a clock pulse input terminal 162 on the storage circuit 160. The output terminals of the storage circuit 160 are coupled to input terminals 174*a–h* of the digital comparator 170 as well as to input terminals 240*a–h* of a line driver amplifier 240. The output lines 1-8 of the line driver circuit 240 provide the seven-bit data output signal and an optional parity signal which is applied to a computer or other interface equipment to which the keyboard is coupled. The digital comparator 170 has an output terminal 176 which is coupled to an input terminal 204 of the pulse generator 200. The circuitry of FIG. 9 operates to provide a strobe output signal and data output signals when a key station is properly actuated and provides a two-key roll-over feature in the following manner.

As a key station is actuated, the logic 0 and 1 signals produced by key station switch closures are converted into seven-bit data signals by the code conversion logic 140 and are applied to the storage circuit 160 which stores the data signals received at input terminals 164*a–h* and outputs the data signals upon the receipt of a clock pulse (shown by waveform 165) generated by pulse generator 200 and applied to terminal 162 of storage circuit 160. The clock pulse will be generated only when generator 200 has received a correct number of closure signals on conductor 194 or a "zero" closure signal on conductor 192 together with an output signal from the digital comparator 170. The digital comparator will provide an output signal only when the input signals to the storage counter, which is also applied to the digital comparator by means of terminals 172*a–h*, is different than the previously stored signal entered in the digital comparator at terminals 174*a–h*. Thus, it is seen that a data output signal will be generated and applied to output lines 1–8 only when the data signal is different from the previous output from the keyboard 135.

Comparator 170 and generator 200 provide the desired hysteresis effect and prevent multiple strobe output signals and therefore multiple data signals from being read when a key is actuated only once. This results since the strobe pulse is generated only after a different signal is applied to the comparator and either a "zero" closure or a "correct" closure signal is received by the pulse generator. If an individual key station is actuated twice, it is noted that a "zero" closure condition will occur and the output of the code conversion logic 140 will be all logic 1's or all 0's depending upon the circuit design and therefore will provide a different signal which will allow the generation of a clock pulse when the same key station is actuated a second time.

Figure 10:
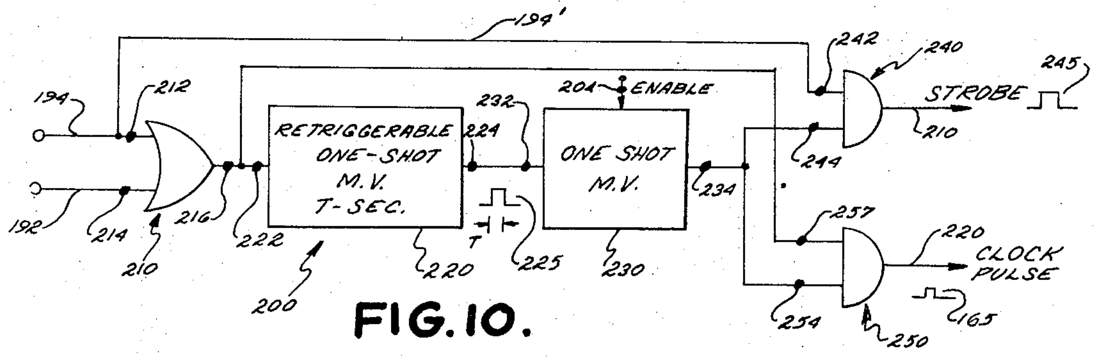
FIG. 10 is a detailed block diagram of the pulse generator shown in FIG. 9.

The pulse generator 200 shown in detail in FIG. 10 includes an input OR gate 210 having an input terminal 212 coupled to conductor 194 and an input terminal 214 coupled to conductor 192. An output terminal 216 of the gate 210 is coupled to an input terminal 222 of a retriggerable one-shot multivibrator 220 which is identical to the multivibrator 110 in FIG. 5. The output terminal 216 of the gate 210 is further coupled to an input terminal 252 of an AND gate 250.

An output terminal 224 of the multivibrator 220 is coupled to an input terminal 232 of the one-shot multivibrator 230 and applies an output pulse, shown by waveform 225, of the multivibrator 220 thereto. Multivibrator 230 is designed to trigger on the trailing edge of the pulse 225 only when an enable signal at input terminal 204 is received from the digital comparator 170. The multivibrator 230 includes an output terminal 234 which is coupled to an input terminal 244 of an AND gate 240 and to a second input terminal 254 of the gate 250. An input terminal 242 of the gate 240 is coupled to the input terminal 212 of the gate 210 by means of conductor 194' as shown in FIG. 10. The output signal of the AND gate 240 is a strobe pulse shown by waveform 245 adjacent output conductor 210. The output of the AND gate 250 is the clock pulse shown by waveform 165 adjacent output conductor 220.

It is noted that the retriggerable one-shot multivibrator 220 in FIG. 10 compensates for keyboard switch contact bounce in much the same manner as the corresponding multivibrator 110 in FIG. 2. Thus, a strobe pulse or clock pulse will not be generated until a time interval T after the last switch contact bounce has expired and the "correct closures" signal is present on line 194. In the event that two keys are simultaneously actuated, the correct number of closures will not occur, and the decoder network 190 of FIG. 9 will not apply a "correct closure" signal to conductor 194.

In the event that two keys are sequentially operated but both keys are simultaneously held down (activated), the circuitry provides a two-key roll-over feature in the following manner. The first key actuated generates a data and strobe signal in the normal manner. The second key which is actuated somewhat later but is held down at the same time the first key is actuated will not generate a correct number of closures on conductor 194. The signal applied to the input terminals 172*a–h* of the differential comparator 170 however will change and be different than the signals on terminals 174*a–h*. The comparator will therefore respond to develop and enable signal at output terminal 176. This signal thereby conditions the one-shot multivibrator 230 shown in FIG. 10 to respond to "correct closures" signal on conductor 194 which is generated as the first key is raised. Thus, a clock pulse and strobe pulse will be generated to couple the data signals corresponding to the second key and stored in the circuit 160 to the output drivers 240 and therefore to the output lines 1–8 after the first key is raised.

It is seen that a clock pulse will be generated at the output of the AND gate 250 in the event that either a "correct closures" signal on conductor 194 or a "zero closure" signal on conductor 192 occurs together with a different data signal fed to the comparator 170. A strobe pulse however will be generated only when a correct number of closures has occurred indicated by the signal on conductor 194. This arrangement causes the latches 160 to change state in both the "zero closures" and "correct closures" condition but generates a strobe pulse only in the presence of "correct closures." The absence of a strobe output pulse 245 prevents the computer or other interface equipment from reading the zero data signal.

To prevent spurious output signals in the event two keys are partially actuated, the conductors 50' (FIGS. 3, 4 and 9) can be weighted such that for a properly actuated key station (i.e., all switch contacts closed), the fixed number indicating "correct closure" is selected to be odd. The adder network 180 will detect an odd number total digital count and the decoder 190 will not generate a "correct closures" signal on line 194 unless an odd count exists. The movable contacts shown in FIGS. 6 and 8 can be employed to assure that an odd count is generated only when a key station is properly actuated by assigning a unitary weight to the three contact fingers 42' which, as explained below, are last to make and first to break. An even number weight is assigned to the remaining conductors 50' of each key station. The associated fixed contacts coupled to three of the conductors 50' will thereby provide an odd count to the adder 180 only when one of the key stations is properly actuated. Other encoding schemes could likewise be used with the circuitry of FIGS. 9 and 10 to provide a strobe output pulse only when a key station is properly actuated.

Figure 11:
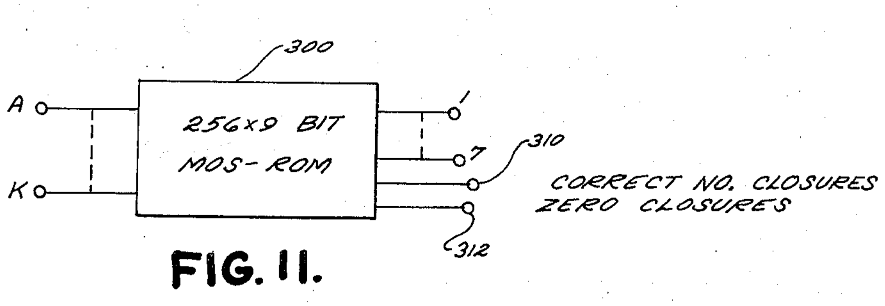
FIG. 11 is a block diagram showing a read-only-memory which can be substituted for the circuitry enclosed by dashed lines in FIG. 9.

The circuitry within the dashed lines shown in FIG. 9 can be replaced by a 256 *x* nine-bit metal-oxide-semiconductor (MOS) read-only-memory circuit 300 shown in FIG. 11. The circuit 300 has input terminals A–K which are coupled to the output terminals A–K of the keyboard 135. Circuit 300 is designed to provide standard seven-bit data output signals on output terminals 1–7 and simultaneously provide an output signal indicative of the correct number of contact closures at an output terminal 310 or "zero closures" at an output terminal 312. The MOS read-only memory can be employed with only eight code input lines instead of the 12 shown, the code being generated by taking four code lines out of the possible eight lines which would yield 70 combinations of code lines to uniquely identify each keyboard symbol. This number should be sufficient for most applications although a four-out-of-nine code could also be incorporated and would yield 126 unique combinations of code lines. With the advent of programmable MOS-ROM, the code conversion logic, adder, and decoder networks enclosed within dashed lines and FIG. 7 can be replaced by a single integrated circuit 300 together with the remaining circuitry of FIG. 9 to provide data output and strobe signals for a variety of individual keyboard applications.

The digital circuits discussed above can be fabricated on a single integrated circuit chip using large scale integrating techniques. When so fabricated, the printed circuit board (52 FIG. 3) on which the fixed contacts are formed, can include a suitable socket and interconnecting conductors for the integrated circuit.

Figure 8:
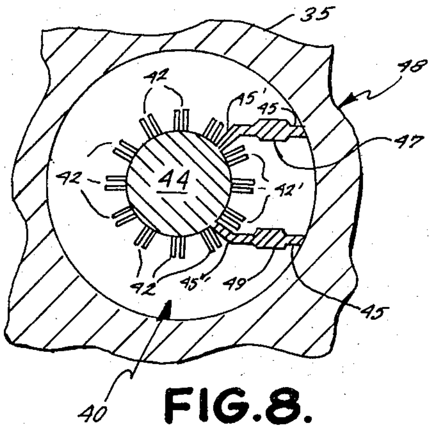
FIG. 8 is an enlarged partial plan view of the movable contact sheet showing the detailed structure of an alternative embodiment of the movable contact of one of the key stations.

The design of the movable switch contact as illustrated in FIGS. 6, 7 and 8 however, can be employed without the need for strobe generating logic and circuitry to provide a mechanically generated strobe pulse which is quite accurate and suitable for many applications particularly to those where expense is a prime design factor. Also as explained above, the switch contacts of FIGS. 6, 7 and 8 can be employed together with the strobe generation and logic circuits of FIGS. 9–11.

The movable contacts 40 shown in FIGS. 6 and 8 comprise a central member 44 of conducting material 35 that is coupled to the sheet 48 of conducting material 35 by means of an integrally formed U-shaped, forked arm 46 as shown in FIG. 6; or two arms 47 and 49 each having tapered ends as shown in FIG. 8. In each design, the member 44 is supported at two points on opposite halves of the member by the associated arm. A plurality of contact finger pairs 42 are coupled to the central members 44 of the movable switch contacts 40 and are arranged around the periphery of the central portion 44. By mounting the central member 44 to the sheet 48 in a cantilevered manner as shown, the three contact fingers 42' adjacent and nearest to the cantilever arms 46 or 47 and 49; will make contact with the fixed contacts located below the movable contact and on the substrate 52 (FIG. 2) last as a key station is actuated. When a key is released, contacts 42' will be the first to break. This switching action is shown in FIG. 7 where the actuation of the movable contact 40 is illustrated.

As seen in FIG. 7, when a key is actuated, first the segment 41 (FIGS. 6 and 7) of arm 46 bends such that the contact fingers 42 remote from segment 41' come into contact with the associated fixed contacts 50 as shown in solid lines in FIG. 7. As the plunger 23 (FIG. 2) continues downwardly when a key is actuated as illustrated by arrow 53; the segments 43 of arm 46 bend in a twisting fashion allowing the plane of member 44 to align in parallel with the support member 52 and causing contact fingers 42' mearest segment 41 of arm 46 to contact their associated fixed contacts 50 as shown in dashed lines in FIG. 7. The movable contact 40 of FIG. 8 operates in a similar fashion with segments 45 or arms 47 and 49 bending first such that contact fingers 42 remote from arms 47 and 49 contact associated fixed contacts. As the plunger 23 continues downwardly, plane 44 will rotate in a twisting fashion about segments 45' of arms 47 and 49 such that the three contact fingers 42' will then contact their associated fixed contacts.

The switches formed by contact fingers 42' and their associated fixed contacts can be employed to generate a strobe pulse directly by coupling the switch so formed to a multivibrator which responds to the closure of contact fingers 42' with fixed contacts 50 to generate a strobe pulse, and which is reset by the opening of the switch so formed. Such a circuit insures that no strobe pulse will be generated until all of the data signal contacts have been closed, and a succeeding strobe pulse will not be generated until all of the preceding key station contacts have opened. Thus, the movable contact design of FIG. 6 and 8 provides a hysteresis effect which can be employed to prevent strobe pulse generation when erroneous data signals are present at the keyboard output terminals. The construction of the switch contacts shown in FIGS. 6–8 is explained in greater detail in an application entitled as allowed KEYBOARD SWITCH ASSEMBLY WITH IMPROVED MOVABLE CONTACT HAVING CANTILEVER SUPPORTED CENTRAL MEMBER WITH RADIALLY EXTENDING CONTACT FINGERS filed on Sept. 8, 1972, Ser, No. 287,508.

It will be apparent to those skilled in the art that various modifications to the keyboard construction and specifically to the movable contact design can be made. Likewise, modifications to the circuitry will be apparent to those skilled in the art. These and other modifications may however fall within the scope of the present invention as defined by the following claims.

The embodiments of the invention in which an exclusive property or privilege is claimed are defined as follows.

1. A data generating system for providing electrical data signals comprising:

a keyboard having a plurality of key stations each representing a symbol for which an electrical data signal is to be generated, each key station comprising an electrical switch having a plurality of fixed electrical contacts which are contacted by a single movable electrical contact, said switch being coupled to a source of operating power and to keyboard output terminals, said fixed contacts of each key station being selected and coupled to said keyboard output terminals such that a unique electrical signal is applied to said output terminals for each key station when actuated to move said movable contact into electrical contact with said fixed contacts associated therewith wherein each of said keyboard output terminals is assigned a predetermined digital weight, and wherein said fixed contacts of each key station are selected to provide an electrical output signal which uniquely identifies each key station and which actuates a plurality of keyboard output terminals that have the same predetermined sum of weighted digital counts for every key station; and electrical circuit means coupled to said keyboard output terminals for detecting and counting the sum of digital weights of the keyboard output terminals actuated and for generating a strobe output pulse only when said predetermined sum is detected indicating that a key station switch has all of the switch contacts associated therewith properly closed to provide an accurate data output signal from said system.

2. The system as defined in claim 1 wherein said electrical circuit includes an adder circuit having weighted input terminals coupled to corresponding weighted keyboard output terminals to detect the weighted sum of keyboard terminals actuated and provide output signals at output terminals representative of the detected sum.

3. The system as defined in claim 2 wherein said electrical circuit further includes a decoding network coupled to said output terminals of said adder network and responsive to signals therefrom to provide a first control signal when said predetermined sum of counts is detected by said adder network indicating that all of the contacts of a key station are closed, a second control signal when none of said switch contacts of a key station are closed, and a third control signal indicating that more than one key station is simultaneously actuated.

4. The system as defined in claim 3 wherein said electrical circuit further includes a strobe pulse generating circuit coupled to said decoding network and responsive to generate a strobe output pulse only upon receiving a first control signal therefrom.

5. The system as defined in claim 4 wherein said strobe pulse generating circuit inlcudes an inhibiting circuit coupled to said decoding network and responsive to said second or third control signals to condition said strobe generating circuit to generate a strobe pulse upon receiving a first control signal and inhibiting successive strobe pulse generation until additional second or third control signals are received from said decoding network.

6. The system as defined in claim 2 wherein each of said keyboard output terminals is assigned a predetermined digital weight such that when all of the switch contacts are closed as a key station is actuated, the sum of the digital weights will always be an odd number.

7. The system as defined in claim 6 wherein said movable contact includes a plurality of contact fingers aligned to contact associated fixed contact when said key station is actuated, said movable contact formed such that predetermined ones of said fingers contact associated fixed contacts first and the keyboard output terminals coupled to these fixed contacts are assigned even numbered weights, and a predetermined odd number of other movable contact fingers contact associated fixed contacts last and the fixed contacts associated therewith are assigned unitary or odd numbered weights.

8. The system as defined in claim 7 wherein said electrical circuit includes network means coupled to said keyboard output terminals for developing a first control signal when all of the switch contacts of a key station are closed as indicated by an odd sum of counts from said keyboard, and for developing a second control signal when none of the keyboard output terminals are actuated.

9. The system as defined in claim 8 wherein said electrical circuit further includes storage circuit means for storing data signals received at input terminals thereon said input terminals coupled to said keyboard output terminals, a pulse input terminal, and output terminals for providing output signals corresponding to stored input signals when a pulse is applied to said pulse input terminal.

10. The system as defined in claim 9 wherein said electrical circuit further includes pulse generating means coupled to said network means and to said pulse input terminal of said storage means, said generating means responsive to said first control signal from said network to generate a strobe output pulse.

11. The system as defined in claim 10 wherein said electrical circuit further includes a comparator coupled to said input and output terminals of said storage circuit for comparing signals thereon and for producing an enable signal at an output terminal thereof when signals at said storage circuit output terminal are different than signals at said input terminals of said storage circuit.

12. The system as defined in claim 11 wherein said pulse generating means includes inhibit circuit means coupled to said output terminal of said comparator for preventing the generation of a strobe output pulse by said pulse generator unless an enable signal is received from said comparator.

13. The system as defined in claim 12 wherein said pulse generating means develops a clock pulse applied to said pulse input terminal of said storage circuit whenever said pulse generating means receives a first or a second contral signal from said network means together with an enable signal from said comparator.

14. An electrical keyboard for providing data signals comprising a plurality of key stations for generating electrical data signals uniquely identifying a symbol associated with each of said key stations, an electrical switch associated with each key station and comprising a single movable contact having a plurality of contact fingers, and an array of associated fixed contacts which are electrically coupled to said single movable contact when said key station is actuated by an operator, a source of operating power coupled to said fixed contacts, output terminals associated with said keyboard and coupled to said fixed contacts of each key station so as to receive electrical signals therefrom when each key station is actuated; and a read-only-memory circuit having input terminals coupled to said output terminals of said keyboard and having data output terminals and first and second control signal output terminals, said memory programmed to convert output signals from said keyboard output terminals to data output signals and to provide a first control signal at said first control signal output terminal indicative that a predetermined number of switch contacts of a key station are closed and to provide a second control signal at said second control signal output terminal indicative of the condition that none of the switch contacts of a key station have been closed.

15. The keyboard as defined in claim 14 and further including a pulse generator circuit coupled to said memory circuit and responsive to said first and second control signals therefrom to generate a strobe output pulse only when a key station is properly actuated as indicated by the presence of said first control signal, said pulse generator further operable to generate clock pulses.

16. The keyboard as defined in claim 15 and further including a storage circuit for receiving data output signals from said memory circuit and storing said signals, said storage circuit having a clock pulse input terminal for receiving said clock pulses from said pulse generator and being responsive thereto to apply said stored input signals to output terminals associated with said storage circuit; said keyboard further including a digital comparator having input terminals coupled to said input terminals of said storage circuit and to said output terminals of said storage circuit for comparing the signals stored in said storage circuit with succeeding input signals applied thereto and for providing an enable signal at an output terminal thereof only when the compared signals are different.

17. The keyboard as defined in claim 16 wherein said pulse generator further includes inhibit circuit means coupled to said output terminal of said digital comparator and responsive to enable signals therefrom to condition said pulse generator to generate a strobe output pulse when a first control signal is received from said read-only-memory circuit.

18. An electrical circuit for use in detecting the closure state of a plurality of switch contacts associated with each key station of a mechanically operated electrical keyboard having a plurality of output terminals electrically coupled to said switch contacts, said circuit comprising:

first circuit means having a plurality of input terminals coupled to the keyboard output terminals for counting the number of keyboard output terminals which are actuated and for generating output signals representative thereof;

second circuit means coupled to said first circuit means for providing a first control signal in response to said output signals from said first circuit means when a predetermined number of output terminals of said keyboard are actuated indicating that all of the switch contacts are properly closed and wherein said second circuit means further provides a second control signal in response to said output signals from said first circuit means when none of said keyboard output terminals are actuated; and a pulse generator coupled to said second circuit means and responsive to said first control signal therefrom to generate a strobe output pulse.

19. The electrical circuit as defined in claim 18 wherein said second circuit means further provides a third control signal in response to said output signals from said first circuit means when the number of said output terminals actuated is less than said predetermined number.

20. The electrical circuit as defined in claim 19 wherein said pulse generator includes a retriggerable monostable multivibrator which responds to said first control signal to provide an output pulse with a pulse width greater than the contact bounce interval of said switch contacts associated with each key station of said keyboard.

21. The electrical circuit as defined in claim 20 wherein said pulse generator further includes a second multivibrator coupled to said first multivibrator and responsive to the trailing edge of said output pulse of said first multivibrator to provide an output signal in response thereto.

22. The electrical circuit as defined in claim 21 wherein said pulse generator further includes an inhibiting circuit coupled to said second circuit means and to said first multivibrator for inhibiting the operation of said first multivibrator after each strobe pulse has been generated until a second or third control signal has been received from said second circuit means.

23. The electrical circuit as defined in claim 24 wherein said inhibiting circuit means comprises: a logic OR gate having a first input terminal coupled to said second circuit means for receiving said second control signals therefrom and a second input terminal coupled to said second control circuit for receiving said third control signals therefrom, said OR gate including an output terminal; a hysteresis latch circuit having a first input terminal coupled to said strobe output terminal of said pulse generator, a second input terminal coupled to said output terminal of said OR gate, and an output terminal; an input logic AND gate having a first input termnal coupled to said second circuit means for receiving said first control signal therefrom, said input AND gate having a second input terminal coupled to said output terminal of said hysteresis latch circuit and an output terminal coupled to said first multivibrator; said latch circuit operable to provide a first output signal when a signal is applied to said second input terminal from said OR gate thereby conditioning said input AND gate to respond to said first control signal and to provide a second output signal conditioning said input AND gate not to respond to said first control signal when a strobe pulse is applied to said first input terminal of said latch circuit.

24. The electrical circuit as defined in claim 21 and further including a storage circuit having a plurality of input terminals for receiving data signals generated by said keyboard, a plurality of output terminals for providing data output signals and a clock input terminal for receiving clock pulses which actuate the storage circuit to apply data signals stored therein to said output terminals.

25. The electrical circuit as defined in claim 24 and further including a digital comparator having a plurality of first input terminals coupled to said input terminals of said storage circuit, a plurality of second input terminals coupled to said output terminals of said storage circuit, and an output terminal, said digital comparator operable to compare the data signals applied to said first input terminals with data signals applied to said second input terminals to provide an enable signal at said output terminal only when said signals applied to said first and second input terminals are different.

26. A method of insuring that all of the switch contacts of a key station of a keyboard are closed before generating a strobe output signal which is employed to condition interface equipment to read the data output signal from the keyboard so as to provide accurate transmission of data between the keyboard and associated interface equipment coupled thereto comprising the steps of:

weighting each switch contact of each key station with a predetermined digital weight;

selecting a data code to uniquely identify each key station of the keyboard and provide a constant predetermined sum of digital counts for each key station of the keyboard;

detecting the sum of digital counts for each key station by electrical means; and generating a strobe output pulse only when said predetermined sum of digital counts has been detected thereby indicating actuation of all of the switch contacts of a key station and an accurate data output signal.

27. In an electrical keyboard for providing electrical data signals uniquely identifying each key station of the keyboard, the combination of:

a movable switch contact for each key station having a plurality of contact fingers adapted to contact associated fixed contacts of a key station when said key station is actuated, said movable contact having at least one contact finger which is last to make contact with an associated fixed contact wherein each contact finger of said movable switch contact except said at least one finger is assigned a predetermined even numbered digital weight, and said at least one contact finger is assigned a unitary weight; and electrical circuit means coupled to the switch contacts of each key station for counting the number of actuated switch contacts for each key station and responsive only to the closure of said at least one contact finger to generate a strobe output pulse upon detecting an odd numbered digital sum when all of the switch contacts of a key station are actuated.

28. A data generating system for providing electrical data signals comprising a keyboard with a plurality of key stations each representing a symbol for which an electrical data signal is to be generated wherein each key station comprises an electrical switch having a plurality of fixed electrical contacts which are contacted by a single movable electrical contact, said switch being coupled to a source of operating power and to keyboard output lines having predetermined assigned digital weights, said fixed contacts of each key station being selected and coupled to said lines such that a unique electrical signal is applied to said lines for each key station when actuated, and wherein the sum of weighted lines is a predetermined constant; and electrical circuit means coupled to said lines for detecting the actuated lines and for generating a strobe output pulse only when all of the switch contacts of a key station are properly closed as indicated by the detection of said predetermined constant.

29. In the system as defined in claim 28 wherein said circuit means includes means for preventing the generation of more than one strobe output pulse when a key station is actuated a single time to provide a hysteresis effect comprising:

a storage circuit coupled to said output lines for storing a data output signal therein;

a digital comparator coupled to said output lines and to said storage circuit for comparing data signals from each and generating an enabling signal when they differ;

detector means coupled to said output lines to generate a first signal when said lines are actuated to provide said predetermined constant digital sum; and pulse generating means coupled to said comparator and to said detector means to generate a strobe pulse when an enabling signal and a first signal is received by said pulse generating means.

* * * * *

PO-1050
(5/69)

UNITED STATES PATENT OFFICE
CERTIFICATE OF CORRECTION

Patent No. 3,803,592 Dated April 9, 1974

Inventor(s) Derek J. Hatley

It is certified that error appears in the above-identified patent and that said Letters Patent are hereby corrected as shown below:

Column 3, line 40:

"os" should be --- of ---.

Column 16, line 34:

After "unitary", insert --- digital ---.

Signed and sealed this 10th day of September 1974.

(SEAL)
Attest:

McCOY M. GIBSON, JR.
Attesting Officer

C. MARSHALL DANN
Commissioner of Patents